United States Patent [19]

Gneuss

[11] Patent Number: 4,464,104
[45] Date of Patent: Aug. 7, 1984

[54] ADJUSTABLE RING NOZZLE FOR EXTRUDING SYNTHETIC-RESIN TUBING

[76] Inventor: Detlef Gneuss, Am hohen Ufer 2a, D-4970 Bad Oeynhausen, Fed. Rep. of Germany

[21] Appl. No.: 416,223

[22] Filed: Sep. 9, 1982

[30] Foreign Application Priority Data

Sep. 26, 1981 [DE] Fed. Rep. of Germany ....... 3138356
May 3, 1982 [DE] Fed. Rep. of Germany ....... 3216377

[51] Int. Cl.$^3$ ............................................. B29F 3/04
[52] U.S. Cl. ........................... 425/192 R; 264/209.2; 425/141; 425/381; 425/465; 425/466; 425/467
[58] Field of Search ................... 425/381, 466, 192 R, 425/141, 465, 467, 380, 461; 264/209.2

[56] References Cited

U.S. PATENT DOCUMENTS

| | | | |
|---|---|---|---|
| 2,665,722 | 1/1954 | Edgemond, Jr. ................... | 144/238 |
| 2,805,446 | 9/1957 | Bartoo ................................ | 425/466 |
| 2,859,476 | 11/1958 | Lainson ............................. | 425/466 |
| 3,124,839 | 3/1964 | Adams ............................... | 425/466 |
| 3,172,437 | 3/1965 | Hansen .............................. | 144/238 |
| 3,184,792 | 5/1965 | Commisso .......................... | 425/466 |
| 3,205,534 | 9/1965 | Langecker ......................... | 425/466 |
| 3,302,240 | 2/1967 | Loos .................................. | 425/467 |
| 3,382,539 | 5/1968 | Zehr .................................. | 425/466 |
| 3,535,739 | 10/1970 | Mehnert ............................. | 425/381 |
| 3,702,751 | 11/1972 | Mehnert ............................. | 425/466 |
| 4,108,590 | 8/1978 | Kontz ................................ | 425/381 |
| 4,368,026 | 1/1983 | Budel et al. ........................ | 425/381 |

FOREIGN PATENT DOCUMENTS

| | | | |
|---|---|---|---|
| 63060 | 10/1982 | European Pat. Off. ............ | 425/466 |
| 961211 | 4/1957 | Fed. Rep. of Germany . | |
| 961130 | 4/1957 | Fed. Rep. of Germany . | |
| 2023008 | 12/1971 | Fed. Rep. of Germany ...... | 425/466 |
| 2542331 | 9/1976 | Fed. Rep. of Germany ...... | 425/466 |
| 2216094 | 10/1974 | France ............................... | 425/466 |

*Primary Examiner*—Jeffery R. Thurlow
*Attorney, Agent, or Firm*—Karl F. Ross; Herbert Dubno

[57] ABSTRACT

A ring nozzle for use with an extruder to continuously form a synthetic-resin tube has a substantially stationary back nozzle part having an axially forwardly directed front face and formed with an axially centered passage opening at the face. This part is typically bolted over the outlet of the extruder. An axially centered core rod is substantially fixed in the passage and extends axially forward past the front face. This rod is also fixed in the extruder so that same can emit a hot and thick tubular strand of a plastified synthetic resin. An annular and movable front nozzle part fits with spacing around the core forward of the front face and forms therewith an axially centered and forwardly open annular gap. The thick tubular strand formed by the extruder becomes a thin-walled strand that emerges from the annular gap. The axially confronting faces of the front and back mold parts have complementary part-spherical surfaces riding on each other and permitting the front nozzle part to tip limitedly on the back nozzle part, but having adjustment elements braced axially at three or more generally angularly equispaced locations between the back and front faces for tipping the front part on the back part and thereby adjusting the gap. Biasing means urges the front part axially back against the adjustment elements. This biasing means includes springs bearing axially back against the front part.

12 Claims, 6 Drawing Figures

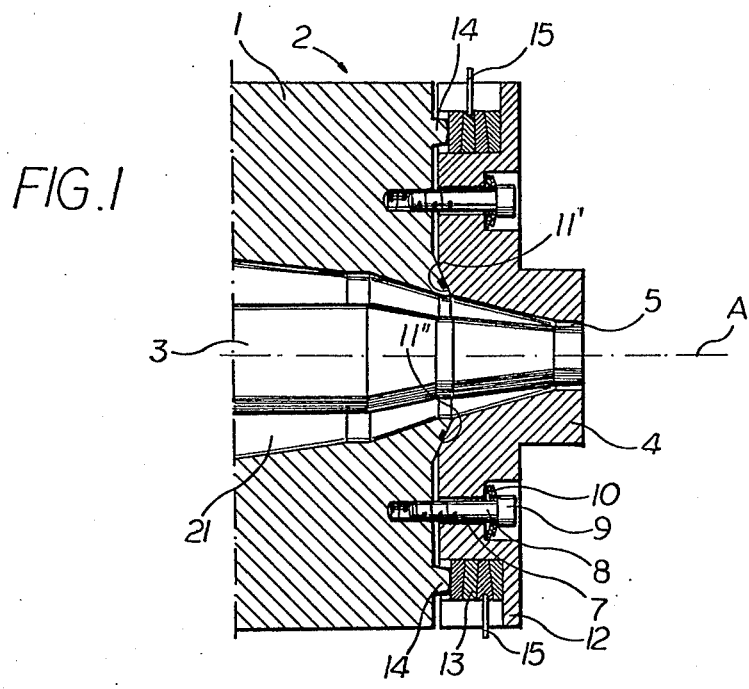
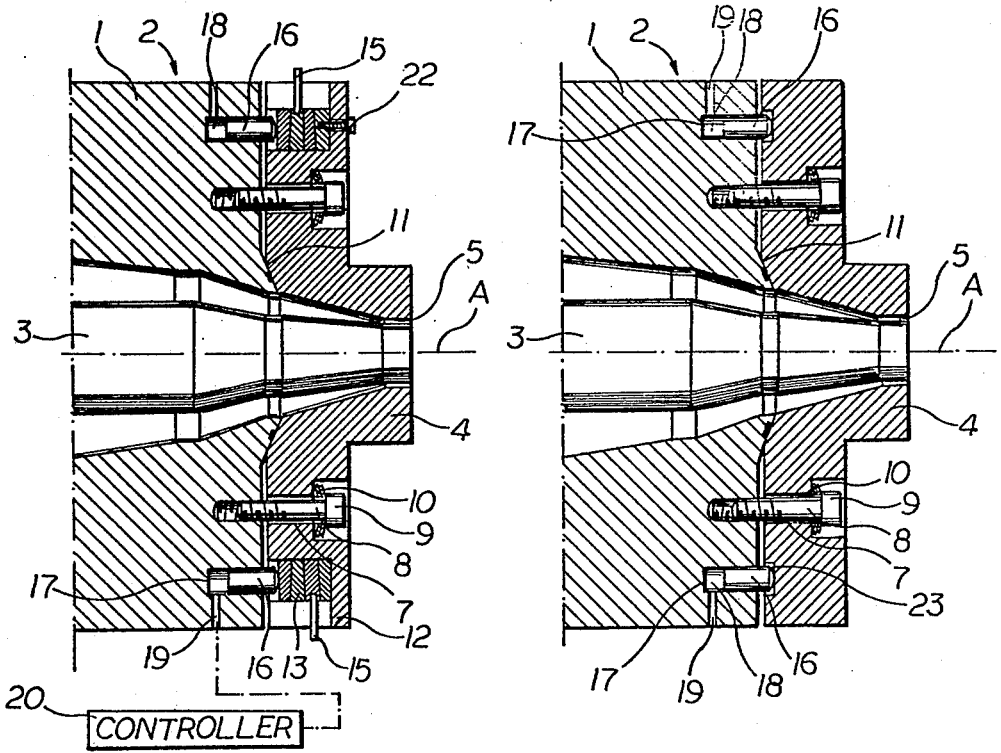

ADJUSTABLE RING NOZZLE FOR EXTRUDING SYNTHETIC-RESIN TUBING

FIELD OF THE INVENTION

The present invention relates to an adjustable ring nozzle for use in conjunction with an extruder to form continuous synthetic-resin tubing. More particularly this invention concerns the type of nozzle that produce a tube wall fine enough that the tubing can be used as bags.

Background of the Invention

A ring nozzle for use with an extruder to continuously form a synthetic-resin tube normally has a substantially stationary back nozzle part having an axially forwardly directed front face and formed with an axially centered passage opening at the face. This part is typically bolted over the outlet of the extruder. An axially centered core rod is substantially fixed in the passage and extends axially forward past the front face. This rod is also fixed in the extruder so that same can emit a hot and thick tubular strand of a plastified synthetic resin. An annular and movable front nozzle part fits with spacing around the core forward of the front face and forms therewith an axially centered and forwardly open annular gap. The thick tubular strand formed by the extruder becomes a thin-walled strand that emerges from the annular gap.

In order to extrude a strand of regular and small wall thickness, it is essential to provide some means for displacing the front nozzle part accurately on the rear nozzle part. Hence, as described in German Pat. No. 961,211 of H. Koch, it is standard to provide a plurality of angularly equispaced and radially extending adjustment screws threaded into the front nozzle part and bearing on the core rod. To change the spacing in one location the respective screw is turned in or out, after oppositely adjusting the diametrally opposite screw. This procedure is arduous so that it is rarely executed with the precision required in many plastics-tubing products.

It is also known, as for example from German Pat. No. 961,130, to form the axially confronting faces of the front and back mold parts with complementary part-spherical surfaces riding on each other and permitting the front nozzle part to tip limitedly on the back nozzle part. In this system the adjustment screws extend through respective axially throughgoing bores in the front part and are threaded in the back part. The heads of these screws bear axially backward on the front part. Thus to adjust the gap the screw on the too-thin portion is screwed out a little and the diametrally opposite screw is screwed in. In this system it is also very difficult to adjust the gap accurately.

Objects of the Invention

It is therefore an object of the present invention to provide an improved ring nozzle.

Another object is the provision of such a ring nozzle which overcomes the above-given disadvantages.

A further object is to provide a ring nozzle that is substantially easier to adjust accurately than the prior-art nozzles.

Summary of the Invention

These objects are attained according to the instant invention in a ring nozzle of the above-described general type, that is wherein the axially confronting faces of the front and back mold parts have complementary part-spherical surfaces riding on each other and permitting the front nozzle part to tip limitedly on the back nozzle part, but having adjustment means including adjustment elements braced axially at three or more generally angularly equispaced locations between the back and front faces for tipping the front part on the back part and thereby adjusting the gap, and with biasing means urging the front part axially back against the adjustment elements. This biasing means includes springs bearing axially back against the front part.

With this system it is possible to adjust the nozzle very accurately. Only one of the adjustment elements need be adjusted at a single time. As a result accurate adjustment is easy.

According to a feature of this invention the adjustment elements are axially centered rings axially engaged between the front and back faces and having flatly axially abutting planar ring faces lying in planes that are transverse but not perpendicular to the axis of the nozzle. Thus angularly displacing the rings relative to each other tips the front part on the back part. Normally the rings are constituted as cylinders with one end face perpendicular to the axis and the other tipped a few degrees to it so that extremely precise adjustment is possible.

Adjustment of such rings can be by means of a radially projecting arm on one of the rings. In such an arrangement angular displacement of the arm rotates the respective ring. It is also possible for at least one of the rings to be formed with an annular array of teeth, in which case the adjustment means includes a drivable pinion meshing with the teeth. An electric stepping motor carrying this pinion can be operated by an electronic controller in response to the outputs of sensors mounted on the nozzle.

One of the parts in accordance with the invention is formed with a radially outwardly projecting flange forming part of the respective face and bearing axially against the rings. In this case the other of the parts can be provided on the respective face at the locations with an annular and axially projecting bump bearing on the set of rings.

It is also possible according to another feature of this invention for one of the rings to be fixed on or even unitary with one of the parts. This one part can therefor simply have a face that is not perpendicular to the axis on which the central hole of the one part is centered.

In accordance with another feature of this invention the adjustment elements include rollers axially engaged with at least one of the rings. These the rollers are tapered so that as one ring is turned it is held centered but moves easily.

One of the parts according to the invention can be provided with respective axially displaceable second adjustment elements bearing axially against the rings at the locations.

It is also within the scope of this invention for the adjustment elements to be axially displaceable in one of the parts and to be axially engageable against the face of the other part, either directly or through the rings.

The adjustment elements can also be screws threaded in the one part. They may also be hydraulic pistons slidable in the one part. In this case the adjustment means further has means for hydraulically displacing the pistons in the one part. Such hydraulic control means can also be operated by an automatic electronic controller.

According to another features of the invention the front nozzle part has a mounting ring and the rings are engaged between the back part and the mounting ring.

DESCRIPTION OF THE DRAWING

The above and other features and advantages will become more readily apparent from the following, reference being made to the accompanying drawing in which:

FIG. 1 is an axial section through a nozzle according to this invention;

FIG. 2 is an axial section through the adjustment rings according to this invention;

FIGS. 3 and 4 are axial sections through further nozzles in accordance with this invention.

SPECIFIC DESCRIPTION

Figure 5:
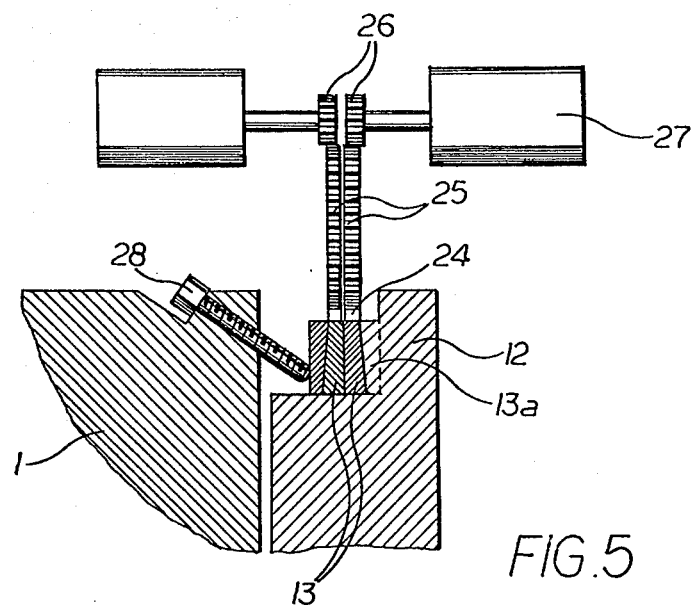
FIGS. 5 and 6 are axial sections through details of further arrangements according to the invention.

As seen in FIGS. 1 and 2 a nozzle 2 according to this invention has a rear nozzle part 1 that is normally fixed on or even part of an extruder and that is formed with a central passage 21 centered on an axis A. A core rod 3 also centered on this axis A lies in this passage and is also usually part of the extruder. A front nozzle part 4 rides via a part-spherical surface 11' on a complementary such surface 11" formed on the part 1 around the passage 21. Thus the front part 11' can be tipped from a position perfectly aligned with the axis A so that the gap formed between it and the end of the core rod 3 can be adjusted, while no leakage is possible between the surfaces 11' and 11".

The front part 4 is formed with six angularly equispaced and axially throughgoing bores 7 equispaced from the axis A. Respective screws 8 extend through these bores 7 and are screwed into the part 1. These screws have heads 9 bearing via respective stacks of belleville-washer springs 10 back against the part 4. Thus in any tipped position of the part 4 relative to the part 1 the springs 10 will hold the two tightly together at the surfaces 11' and 11".

A flange 12 extending radially outwardly from the front of the front part 4 axially confronts an annular bump 14 formed on the confronting front face of the rear part 1. A stack of four rings 13 is provided between this annular bump 14 and flange 12. Each such ring has, as seen in FIG. 2, a planar face 13' that is slightly tipped to the opposite face 13" of the ring 13. In addition at least the two center rings 13 are provided with radially projecting arms 15 by means of which they can be pivoted about the axis A.

When the two rings are perfectly offset in 180° opposite positions as seen in FIG. 2, the faces 13" are parallel and perpendicular to the axis A. Turning either of the rings 13 from this position tips the outer part 4 on the inner part 1. The slight canting of the outer part 4 allows the gap 5 to be adjusted accurately, with the springs 10 pushing it back with enough force, regardless of the angular position, to prevent leakage between the surfaces 11' and 11".

The arrangement of FIG. 2 is identical to that of FIGS. 1 and 2 except that here one of the rings 13 is secured by screws 22 to the flange 12. In addition the rear part 1 is not provided with an annular bump, but with at least three angularly equispaced short pistons 16 sliding in long axially extending bores 17 formed in the rear part 1. The pistons 16 always project from chambers 18 in the bores 17 which are connected via respective conduits or passages 19 to an electronic/hydraulic controller. By adjusting pressure differently in the chambers 18 it is possible to achieve a coarse adjustment of the gap 5 relatively easily.

In FIG. 4 the pistons 16 bear directly on the part 4 at pockets 23 formed in the rear face of the front part 4. Thus in this arrangement, which otherwise is identical to that of FIG. 1, the pistons 16 alone constitute the adjustment elements.

FIG. 5 shows an arrangement wherein the two rings 13 are formed with teeth 24 meshing via gears 25 with pinions 26 carried on respective motors 27. These motors 27 in turn are operated by an electronic controller, in response to strain-gauge sensors in the nozzle 2. In addition in this arrangement three mainly axially displaceable bolts or screws 28 bear axially forward against the stack of rings 13, and the frontmost ring 13a is unitarily formed with the flange 12.

Figure 6:
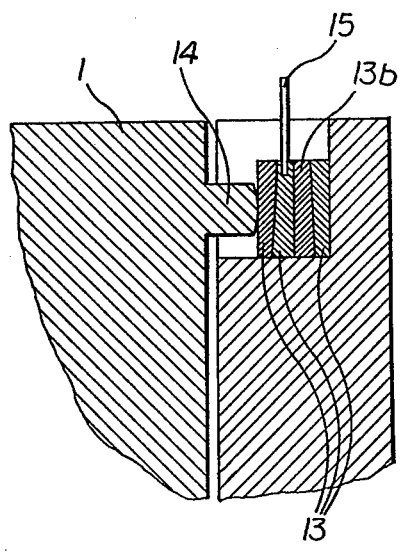

Finally, FIG. 6 shows an arrangement like FIG. 1, but wherein one of the rings is replaced by an annular array of tapered rollers 13b having a cage that is not illustrated. In this system the rollers 13b make rotating the adjacent rings 13 much easier. Such rollers 13b could also be provided between each ring 13 and the adjacent ring or surface.

In the arrangement according to the instant invention it is possible to achieve an accurate adjustment of the nozzle in a very simple manner. The rings 1 can tip the front part 4 through very small and accurately determined increments. Since it is not necessary to loosen on one side before tightening on another, the adjustment can be carried out rapidly and efficiently.

I claim:

1. A ring nozzle for use with an extruder to continuously form a synthetic-resin tube, the ring nozzle comprising:

a substantially stationary back nozzle part having an axially forwardly directed front face and formed with an axially centered passage opening at the face;

an axially centered core rod substantially fixed in the passage and extending axially forward past the front face;

an annular and movable front nozzle part fitted spacedly around the core rod forward of the front face and forming therewith an axially centered and forwardly open annular gap, the front part having a back face axially confronting the front face of the back part, the front and back faces being formed around the passage and centered on the axis with complementary part-spherical surfaces riding on each other and permitting the front nozzle part to tip limitedly on the back nozzle part and thereby vary the radial dimensions of the gap;

adjustment means including axially centered rings axially engaged between the front and back faces and having flatly axially abutting planar ring faces lying in a plane that is transverse but not perpendicular to the axis of the nozzle, whereby angularly displacing the rings relative to each other tips the front part on the back part, the rings being braced axially between the back and front faces for tipping the front part on the back part and thereby adjusting the gap; and biasing means including springs bearing axially back against the front part for urging the front part axially back against the rings and therethrough back against the back nozzle part.

2. The ring nozzle defined in claim 1 wherein one of the parts is formed with a radially outwardly projecting flange forming part of the respective face and bearing axially against the rings.

3. The ring nozzle defined in claim 2 wherein the other of the parts is provided on the respective face with an axially projecting annular bump bearing on the set of rings.

4. The ring nozzle defined in claim 1 wherein at least one of the rings is provided with a radially projecting arm, whereby angular displacement of the arm rotates the respective ring.

5. The ring nozzle defined in claim 1 wherein at least one of the rings is formed with an annular array of teeth, the adjustment means including a drivable pinion meshing with the teeth.

6. The ring nozzle defined in claim 1 wherein one of the rings is unitary with one of the parts.

7. The ring nozzle defined in claim 1 wherein one of the rings is fixed on one of the parts.

8. The ring nozzle defined in claim 1 wherein the adjustment means include rollers axially engaged with at least one of the rings.

9. The ring nozzle defined in claim 8 wherein the rollers are tapered.

10. The ring nozzle defined in claim 1 wherein one of the parts is provided with respective axially displaceable second adjustment elements bearing axially against the rings at the locations.

11. The ring nozzle defined in claim 1, further comprising an automatic electronic controller connected to the adjustment elements for displacing same.

12. The ring nozzle defined in claim 1 wherein the back part includes bolts projecting axially forward through the front part, the spring means including spring washers engaged around the bolts and bearing axially backward on the front part.

* * * * *